United States Patent [19]

Nanjoh

[11] Patent Number: 4,685,035
[45] Date of Patent: Aug. 4, 1987

[54] COMPONENT MOUNTING DEVICE

[75] Inventor: Hideo Nanjoh, Okayama, Japan

[73] Assignee: Omron Tateisi Electronics Co., Kyoto, Japan

[21] Appl. No.: 896,866

[22] Filed: Aug. 15, 1986

[30] Foreign Application Priority Data

Aug. 20, 1985 [JP] Japan .................... 60-127630[U]

[51] Int. Cl.$^4$ .............................................. H02B 1/10
[52] U.S. Cl. ...................................... 361/429; 174/58; 200/296; 248/27.1; 361/331; 361/380
[58] Field of Search .................. 174/58; 200/295, 296; 248/27.1, 27.3; 361/331, 339, 344, 380, 390, 391, 429

[56] References Cited

U.S. PATENT DOCUMENTS 2,531,698 11/1950 Petrich et al. .................... 174/58

Primary Examiner—A. D. Pellinen
Assistant Examiner—G. Thompson
Attorney, Agent, or Firm—Wegner & Bretschneider

[57] ABSTRACT

A component mounting for use in mounting device a component to a panel member therethrough, which comprises a centrally opened frame having at least one carrier arm extending from the frame in a direction substantially perpendicular to the plane of the central opening in the frame. The carrier arm carries a clamp member for movement therealong, and the clamp member has an internally threaded screw receiving hole defined therein for engagement with a set screw that has been freely passed through a hole in the component. After the mounting device has been inserted in a mounting hole in the panel member and the set screw has been threaded into the screw receiving hole, the clamp member is drawn along the carrier arm close towards the panel member thereby clamping the panel member between it and the frame.

2 Claims, 7 Drawing Figures

COMPONENT MOUNTING DEVICE

BACKGROUND OF THE INVENTION

APPLICABLE FIELD OF TECHNOLOGY

The present invention relates to a mounting utilizeable for mounting a component to a panel or a wall.

The term "component" hereinabove and hereinafter used is to be understood as meaning any article of manufacture or any device of a type designed to be mounted to a panel or a wall when in use, such as, for example, a wallmounted dimmer switch for adjusting the illumination, a wall-mounted telephone set, a gauge or a cluster of gauges, an instrument display, or an electric switch or a cluster of electric switches, or the like regardless of the particular field of application. However, for the purpose of description of the present invention, reference will be made to a rotary dimmer switch as an electric component desired to be mounted to the wall by the use of the component mounting according to the present invention herein disclosed.

DESCRIPTION OF THE PRIOR ART

Different methods of mounting the rotary dimmer switch to a wall surfacing panel hitherto largely practiced are illustrated in FIGS. 6 and 7, respectively. Referring first to FIG. 6, the rotary dimmer switch 13 comprises a casing 14 of a generally cubic configuration having a flanged front wall member 15 through which a control knob 14a is exposed for the access to an operator. The wall surfacing panel is identified by 1 and has a mounting opening 2 defined therein in a shape sufficient to pass the casing 14 therethrough, but undersized relative to the shape of the flanged front wall member 15.

When mounting the rotary dimmer switch 13, the casing 14 is first inserted through the mounting opening 2 in the wall surfacing panel 1 until the peripheral flange of the front wall member 15 defined exteriorly of an area thereof bound by the casing 14 is brought into contact with the peripheral lip region of the surfacing panel 1 around the mounting opening 2. Thereafter, set screws 17 are, after having been freely passed through holes 16 defined in respective fitting lugs 16a integral or rigid with the front wall member 15, firmly driven into the surfacing panel 1.

According to the method shown in and described with reference to FIG. 6, depending on the type of the surfacing panel, the peripheral lip region of the surfacing panel 1 around the mounting opening 2 must have been formed with associated screw receiving holes 1a at respective locations exactly aligned with the holes 16 in the fitting lugs 16a. Where the surfacing panel 1 is a metal plate, each of the screw receiving holes 1a must be threaded to conform to the threaded pattern of the respective set screw 17, and so is required a drilling operation and a subsequent tapping operation to be carried out preparatory to the actual mounting of the rotary dimmer switch 13.

In the method shown in FIG. 7, the set screws 17 need not be driven directly into the surfacing panel 1, but use is made of a generally square frame-like mounting 3' having an opening defined therein for the loose passage of the casing 14 therethrough. This mounting 3' is made of either a metallic material or a plastic material and has internally threaded screw receiving holes 3a defined therein in alignment with the holes 16 which are, in the instance as shown in FIG. 7, formed in the peripheral flange of the front wall member 15.

The mounting 3' also has a plurality of resiliently yieldable latch arms 6' rigidly secured to or integrally formed with the mounting 3' so as to protrude generally at right angles thereto in a direction which would confront the mounting opening 2. Each of the latch arms 6' has a generally arrow-shaped free end having a step defined at 6b and spaced a distance d from the mounting 3'.

When mounting the rotary dimmer switch 13 to the surfacing panel 1 according to the method shown in and described with reference to FIG. 7, the mounting 3' is first secured to the peripheral flange of the front wall member 15 with the set screws 17 freely passed through the hole 16 and then firmly driven into the screw receiving holes 3a in the mounting 3'. The assembly is then inserted into the mounting hole 2 while allowing the latch arms 6' to deform inwardly with respect to each other against their own resiliency in sliding contact with the peripheral face defining the mounting opening 2. Upon the completion of the insertion of the assembly, the latch arms 6'0 return to their original shape by the effect of their own resiliency permitting the peripheral lip region of the surfacing panel 1 around the mounting opening 2 to be sandwiched between the mounting 3' and the steps 6b in the latch arms 6'.

The use of the mounting 3' of the design shown in and described with reference to FIG. 7 has been found having a problem. Specifically, in order to avoid any possible jolting motion of the rotary dimmer switch already mounted in position to the surfacing panel 1 with the intervention of the mounting 3', the distance d between the mounting 3' and the step 6b in each latch arm 6'0 must be equal to the thickness d' of the surfacing panel 1 so that the peripheral lip region of the surfacing panel 1 around the mounting opening 2 can be steadily embraced between the steps 6b and the mounting 3'. This means that, although according to the method of FIG. 6 the thickness of the surfacing panel 1 does not matter, the mounting 3' of the design shown in and described with reference to FIG. 7 can only be useable with the surfacing panel 1 of a particular wall thickness. In other words, a number of mountings having the latch arms of different lengths must be prepared one for a particular thickness of the surfacing panel or any other plate member to which the rotary dimmer switch or the like component is desired to be fitted.

SUMMARY OF THE INVENTION

Accordingly, the present invention has been devised with a view to substantially eliminating the above discussed problems inherent in the conventionally practiced mounting methods and has for its essential object to provide an improved mounting effective to mount the rotary dimmer switch or the like component to the surfacing panel or the like wall member having a varying wall thickness.

In order to accomplish this object of the present invention, the mounting herein disclosed comprises a frame having a central opening defined therein for the free passage of the body of the component therethrough, at least one carrier arm integral at one end with the frame and having a lengthwisely extending passageway defined therein for the support of a generally rectangular clamp member. The clamp member has an internally threaded screw receiving hole defined at one end thereof, the other end of which is adapted to clamp a peripheral lip region of the panel member around the mounting opening in cooperation with the frame when the set screw passing freely through the flange of the component is threaded into the screw receiving hole.

In this construction, since the clamp member is movable close towards the frame as the set screw is fastened, the component can be mounted to the panel member of varying thickness.

BRIEF DESCRIPTION OF THE DRAWINGS

This and other objects and features of the present invention will become clear from the following description taken in conjunction with a preferred embodiment thereof with reference to the accompanying drawings, in which.

DETAILED DESCRIPTION OF THE EMBODIMENT

Figure 6:
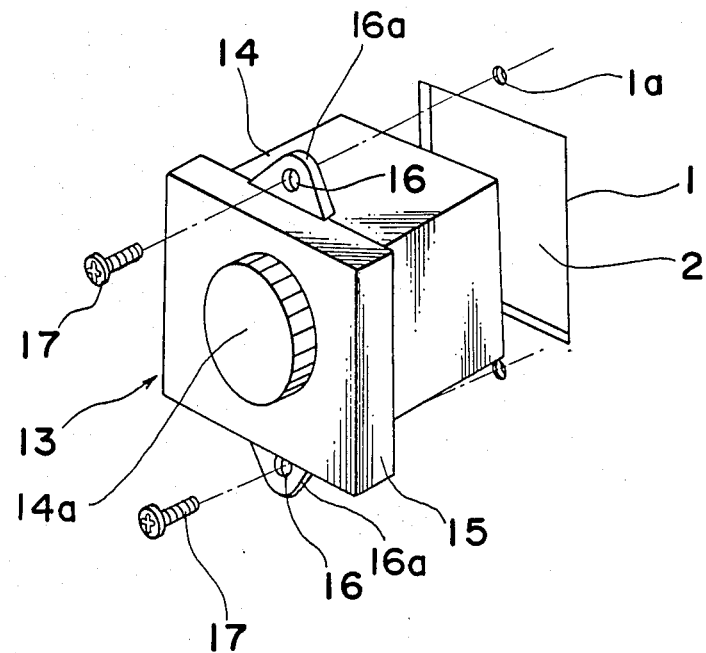
FIGS. 6 and 7 are perspective views of the rotary dimmer switch being mounted in a panel opening according to the prior art.
Figure 7:
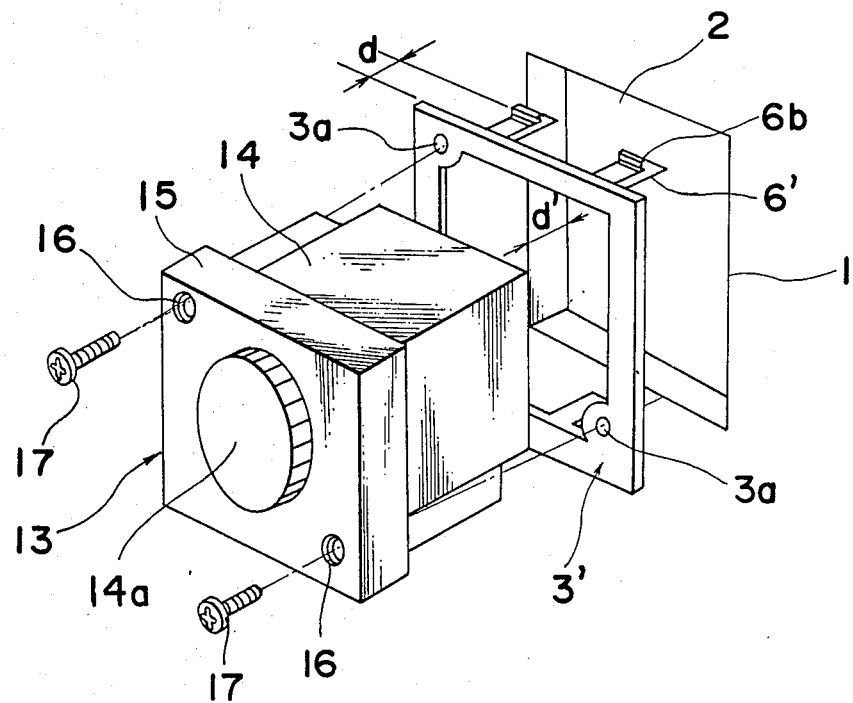

In the description of the present invention which follows, like parts are designated by like reference numerals throughout the accompanying drawings, inclusive of FIGS. 6 and 7.

Referring now to FIGS. 1 to 5, the mounting according to the present invention generally identified by 3 comprises a generally square frame 5 having a central opening 4 defined therein of such a shape that the casing 14 may pass freely therethrough. The mounting frame 5 is integrally formed with a plurality of, for example, two, carrier arms 6 generally diagonally spaced with respect to the shape of the mounting frame 5 and protruding in a direction opposite to the rotary dimmer switch 13. The carrier arms 6 have their free ends 6a so curved as to extend inwardly of the mounting frame 5, terminating at respective locations where the free ends 6a would not interfere with the passing of the casing 14 through the central opening 4 in the mounting frame 5.

Figure 1:
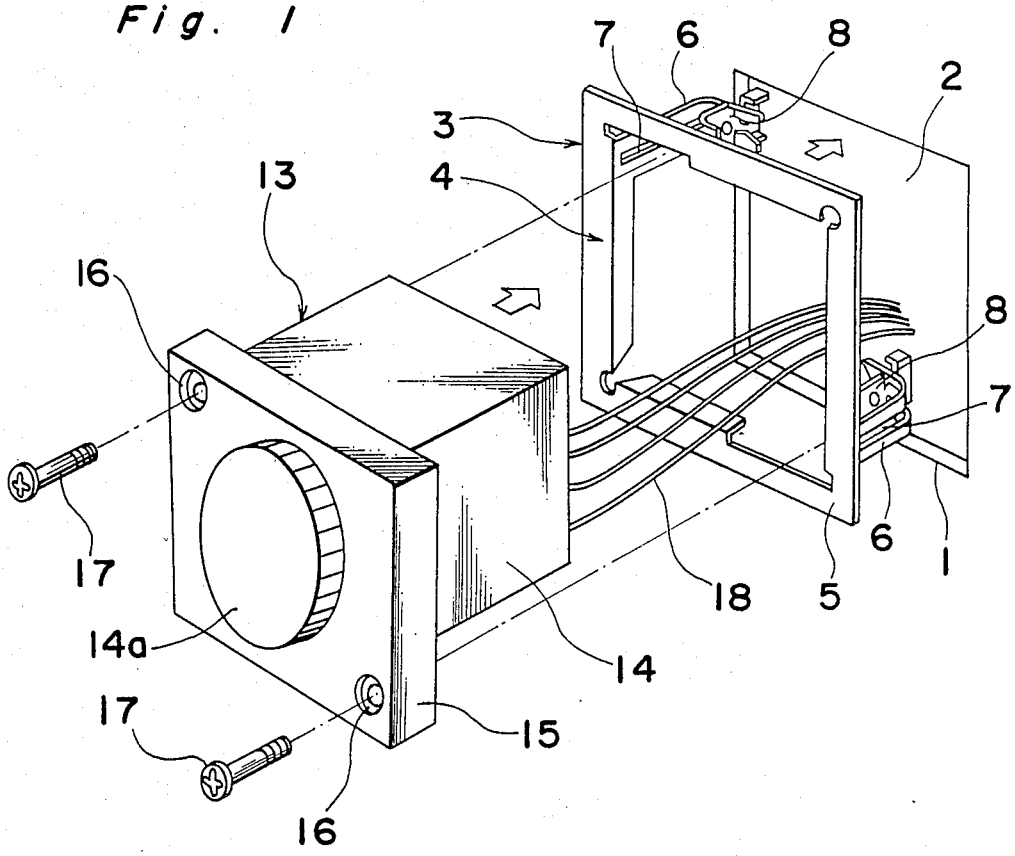
FIG. 1 is a perspective view of a rotary dimmer switch ready to be mounted in a panel opening with the use of a mounting device according to the present invention.
Figure 2:
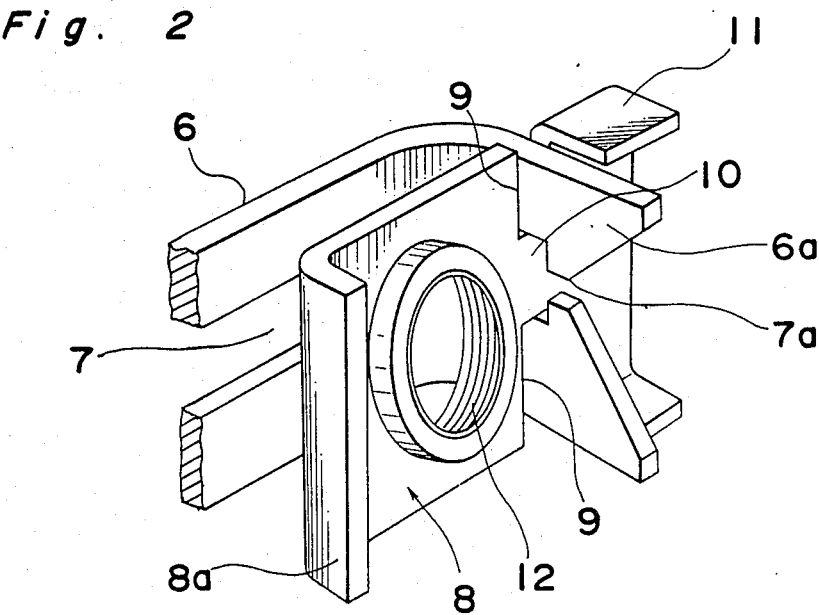
FIG. 2 is a perspective view, on an enlarged scale, showing one carrier arm having a clamp member in a folded position.
Figure 4:
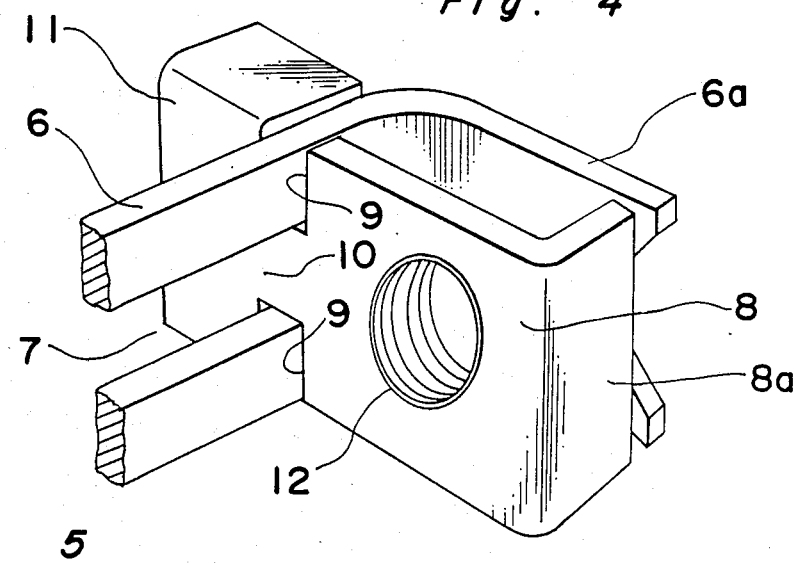
FIG. 4 is a view similar to FIG. 2 showing the clamp member in the operating position.

As best shown in FIGS. 1, 2 and 4, each of the carrier arms 6 has a passageway 7 defined therein so as to extend generally intermediate of the width thereof in a direction axially thereof, opening inwardly from the associated free end 6a.

Figure 3:
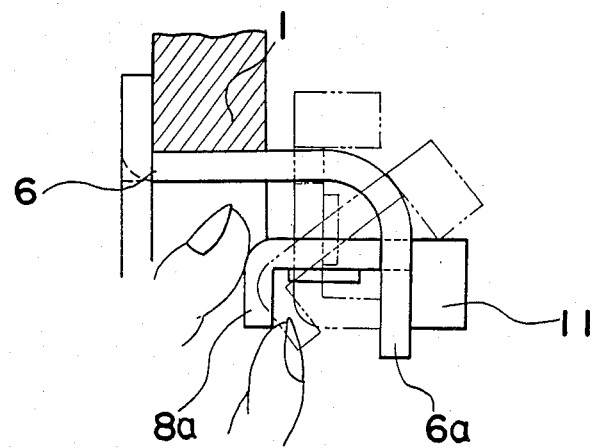
FIG. 3 is a top plan view of a portion of the mounting device showing the carrier arm with the clamp member being moved from the folded position towards an operative position.

A generally rectangular plate-like clamp member 8 is carried by each carrier arm 6 for movement between folded and operative positions along the respective passageway 7, the details of which will now be described with particular reference to FIGS. 2 to 4. The clamp member 8 has its generally intermediate portion formed with a pair of guide grooves 9 cut inwardly therefrom from the opposite side edges in a direction close towards each other, leaving a neck region 10 of a width equal to or slightly smaller than the width of the passageway 7. The clamp member 8 also has internally threaded, screw receiving holes 12 defined in one end portion thereof, the other end portion of said clamp member 8 on one side of the guide grooves 9 opposite to the screw receiving hole 12 serving as a clamp face 11 which cooperates with the frame 5 as will be described later.

The clamp member 8 is carried by each carrier arm 6 with the neck region 10 slidably received in the passageway 7 while portions of said arm 6 on respective sides of the passageway 7 are slidably received in the respective guide grooves 9. Thus, the clamp member 8 is movable along the passageway 7 between the folded position, in which the clamp member 8 is carried by the free end 6a of the associated carrier arm 6 in a perpendicular relationship with the plane of the central opening in the mounting frame 5 as shown in FIG. 2, and the operative position in which it assumes a parallel relationship with the plane of the central opening in the mounting frame 5 as shown in FIG. 4.

In the construction so far described, in order for the rotary dimmer switch 13 to be mounted to the wall surfacing panel 1 with the casing 14 received in the mounting opening 2, prior to the rotary dimmer switch 13 being electrically connected with wall-embedded wiring 18 as shown in FIG. 1, the mounting frame 5 is first inserted into the mounting opening 2 while the clamp members 8 are held in the folded position. Since when the clap members 8 are in the folded position, the end portions thereof remote from the associated screw receiving holes 12 are positioned inwardly with respect to the associated carrier arms 6 without protruding laterally outwardly thereof as shown in FIG. 1, the carrier arms 6 can readily pass through the mounting opening 2 without substantially interfering with the peripheral lip region of the surfacing panel 1 around the mounting opening 2. After the wiring lines 18 have been connected with the rotary dimmer switch 13, each of the clamp members 8 in the folded position as shown by the solid line in FIG. 3 has to be moved towards the operative position. This can be accomplished by turning each clamp member 8 along the curved point in the associated carrier arm 6 in a manner shown by the phantom lines in FIG. 3 until the clamping face 11 of the respective clamp member 8 is brought to a position where it confronts of facing the mounting frame 5.

Thereafter, the casing 14 is inserted through the central opening in the mounting frame 5 into the mounting opening 2 until the peripheral flange of the front wall member 15 is brought into contact with the peripheral lip region of the surfacing panel 1 around the mounting opening 2 through the intervention of the mounting frame 5 therebetween. Then, the set screws 17 are passed through the holes 16, defined in the peripheral flange of the front wall member 15 across the thickness thereof, and are subsequently turned by the use of a screw driver as shown in FIG. 5 to allow the respective free ends of the set screws 17 to be driven into the screw receiving holes 12 in the associated clamp members 8 then held in the operative position.

Figure 5:
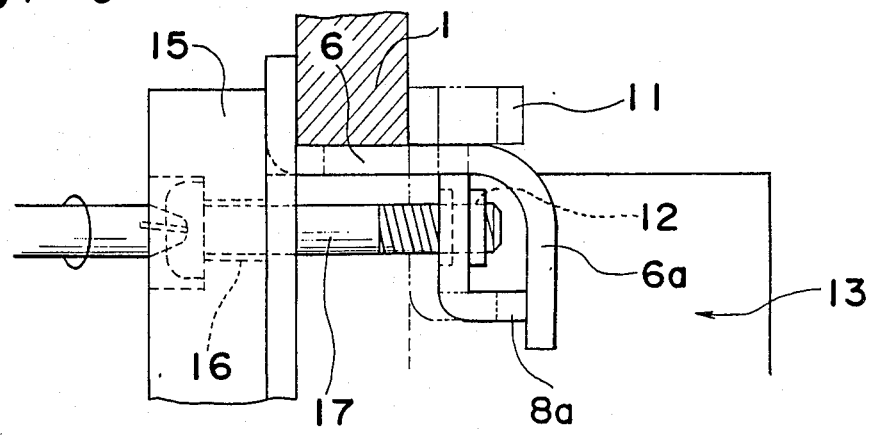
FIG. 5 is a top plan view of a portion of the mounting device showing how the rotary dimmer switch is mounted in the panel opening.

As each set screw 17 is turned in a fastening direction, the respective clamp member 8 having its screw receiving hole 12 receiving therein the set screw 17 is drawn close towards the mounting frame 5, and simultaneously with the complete fastening of the set screw 17, the peripheral lip region of the surfacing panel 1 around the mounting opening 2 is firmly clamped between the mounting frame 5 and the clamping face 11 of the respective clamp member 8 as clearly shown by the phantom line in FIG. 5.

Preferably, in order to avoid any possible separation of each clamp member 8 from the associated carrier arm 6, the free end 6a of the respective carrier arm 6 may be provided with a block member having a clearance of a size generally equal to the thickness of the clamp member 8, but smaller than the width of the neck region 10 of the clamp member 8. In the illustrated embodiment, the block member comprises a pair of block pieces 7a as shown in FIG. 2, which are integrally formed with the free end 6a of each clamp member 8 so as to protrude into the passageway 7 in a direction close towards each other with a clearance defined therebetween of a size generally equal to the thickness of the clamp member 8, but smaller than the width of the neck region 10 of the clamp member 8, said passageway 7 opening through the clearance between the block pieces 7a. The positioning of the clamp member 8 relative to the associated carrier arm 6 can be accomplished by inserting the clamp member 9 into the passageway 8 through the clearance while the clamp member 8 being inserted is so turned as to permit the thicknesswise direction of the clamp member 8 to be oriented at right angles to the passageway 7.

Also, preferably, in order to ensure that, when the clamp member 8 carried by each carrier arm 6 is turned to the operative position as shown in FIG. 4, the plane of the clamp member 8 containing the clamping face 11 can assume a parallel relationship with the plane of the central opening in the mounting frame 5 so that the tip of the associated set screw can readily be received in the associated screw receiving hole 12. The clamp member 8 may have a spacer formed at 8a for engagement of the free end 6a of the clamp member 8 as best shown in FIGS. 4 and 5.

From the foregoing description, it has now become clear that the mounting designed according to the present invention is effective to mount the component to the panel member of varying thickness. Therefore, according to the present invention, the necessity of the manufacture of a variety of mountings for use for the panel members of different thicknesses can be substantially eliminated.

Although the present invention has been described in connection with the preferred embodiment thereof with reference to the accompanying drawings, it is to be noted that various changes and modifications are apparent to those skilled in the art. By way of example, the component desired to be mounted with the use of the mounting of the present invention may be of any type provided that it has a mounting flange with one or more holes defined therein for the free passage of respective set screws. Moreover, the number of the carrier arms 6 for each mounting frame 5 may not be limited to two such as shown and described, but may be one or more than two, depending on the size of the component desired to be mounted.

Accordingly, such changes and modifications are to be understood as included with the scope of the present invention as defined by the appended claims, unless they depart therefrom.

What is claimed is:

1. A component mounting device for mounting a component to a panel member having a mounting opening defined therein, said component having a peripheral flange with at least one hole defined therein, said device comprises:

a mounting frame having a central opening defined therein for the free passage of the body of a component therethrough;

at least one carrier arm having one end integral with said mounting frame and extending therefrom in a direction substantially perpendicular to the plane of the central opening, the other end of said carrier arm being bent so as to extend inwardly of the mounting frame, said carrier arm having a passageway defined therein so as to extend generally intermediate of the width thereof in a direction axially thereof, opening inwardly from said other end of the carrier arm; and a generally rectangular clamp member having a hole defined in one end portion thereof and supported in the passageway for movement between a folded position, in which the clamp member lies generally perpendicular to the plane of the central opening, and an operative position in which the clamp member lies substantially parallel to the plane of the central opening, said hole being adapted to receive a set screw which would be passed through said hole in the peripheral flange whereby, when the set screw is fastened, the clamp member clamps a peripheral lip region of the panel member around the mounting opening between the mounting frame and an end of the clamp member to clamp the mounting frame to the panel member.

2. The mounting device as claimed in claim 1, further comprising a block member provided in said other end of the carrier arm for avoiding separation of the clamp member from the carrier arm.

* * * * *